(12) United States Patent
Lim et al.

(10) Patent No.: US 12,555,145 B1
(45) Date of Patent: Feb. 17, 2026

(54) INTELLIGENT DETECTION AND ACQUISITION OF AUTHENTIC PRODUCT REVIEWS FOR CROSS-PLATFORM AVAILABILITY

(71) Applicant: PAYPAL, INC., San Jose, CA (US)

(72) Inventors: Li Hua Lim, Singapore (SG); Tamil Mani Arul, Chennai (IN); Rajasekaran Radhakrishnan, Chennai (IN); Sreeram Vasudevan, Singapore (SG)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 18/922,120

(22) Filed: Oct. 21, 2024

(51) Int. Cl.
*G06Q 30/0282* (2023.01)

(52) U.S. Cl.
CPC ............... *G06Q 30/0282* (2013.01)

(58) Field of Classification Search
None
See application file for complete search history.

(56) References Cited

U.S. PATENT DOCUMENTS

2024/0330605 A1* 10/2024 Hunn .............. H04L 9/3247
2025/0023913 A1* 1/2025 Roytman .......... H04L 41/16

FOREIGN PATENT DOCUMENTS

CN    117407866 A  *  1/2024  .......... G06F 21/552
CN    117910452 A  *  4/2024  .......... G06N 3/08

OTHER PUBLICATIONS

Wikipedia—"Large language model" (Internet Archive snapshot from Sep. 9, 2024, https://web.archive.org/web/20240920110929/https://en.wikipedia.org/wiki/Large_language_model) (Year: 2024).*
Kushwaha et al. ("Comments and Feedback Verification System using Large Language Model," 2024 8th International Conference on Computational System and Information Technology for Sustainable Solutions (CSITSS), Bengaluru, India, 2024, pp. 1-6) (Year: 2024).*

* cited by examiner

*Primary Examiner* — Christopher B Tokarczyk
(74) *Attorney, Agent, or Firm* — Haynes and Boone, LLP

(57) ABSTRACT

There are provided systems and methods for intelligent detection and acquisition of authentic product reviews for cross-platform availability. A service provider may provide computing services to merchants and users for processing various interactions, such as purchasing items electronically. When items or other products are purchased, users may leave reviews. To determine an authenticity of the reviews, the service provider may utilize an intelligent system that may include an LLM or other generative AI. The system may automatically generate questions for users that may be designed by the LLM to elicit responses that verify whether a review is authentic and/or relevant. This may include receiving responses and scoring those responses to verify the user is providing an authentic review. If so, the review may be written to a blockchain, which may allow the review to be pushed to users and/or automatically injected to product pages and checkout flows.

20 Claims, 7 Drawing Sheets

INTELLIGENT DETECTION AND ACQUISITION OF AUTHENTIC PRODUCT REVIEWS FOR CROSS-PLATFORM AVAILABILITY

TECHNICAL FIELD

The present application generally relates to machine learning (ML) and other artificial intelligence (AI) systems and more particularly to using AI systems to detect and acquire authentic product reviews to minimize fraud and publishing of deceptive content.

BACKGROUND

Online service providers may offer various services to end users, merchants, and other entities. This may include providing computing services through different software applications, websites, platforms, and resources, such as those that may be involved with digital transaction processing. For example, computing services may include those used to process transactions through electronic transaction processing data flows, services, and other computing resources. Further, the service provider may provide and/or facilitate the use of applications and websites for online payments, peer-to-peer (P2P) transfers, and/or marketplaces to different entities including merchants. Merchants may offer products for sale, which may be reviewed by customers and consumers on the merchant's platform and/or with platforms provided by the service provider. Further, the service provider may have their own products reviewed, such as their applications, transaction processing services, and the like.

With current product review systems for service providers and merchants, there are issues where product reviews are not authentic, making it difficult to evaluate the product before purchasing. Some product reviewers may provide inaccurate, misleading, or fraudulent product reviews, which may cause harm to both the merchant and other users buying a product, thereby causing a need for improved authenticity of product reviews. For example, ratings may be given to a product when the buyer hasn't used the product long enough to be able to properly provide the review or has used the product improperly, or the purported "buyer" may not even have purchased the product. Real buyers and authentic reviewers may not be incentivized to provide accurate reviews, especially positive reviews. Therefore, the majority of users reviewing a product may mainly contribute negative reviews or inaccurate reviews. Further, it may be time consuming to write reviews and/or complete questionnaires. All of these issues may lead to bad data acquisition and analytics that may be provided to other potential buyers and interested parties. As such, service providers may find it desirable to automate review generation and submission for buyers, as well as identify the authenticity of submitted reviews, which may assist with obtaining authentic and useful data for proper data analytics, outreach, and user informational notification.

Figure 1:
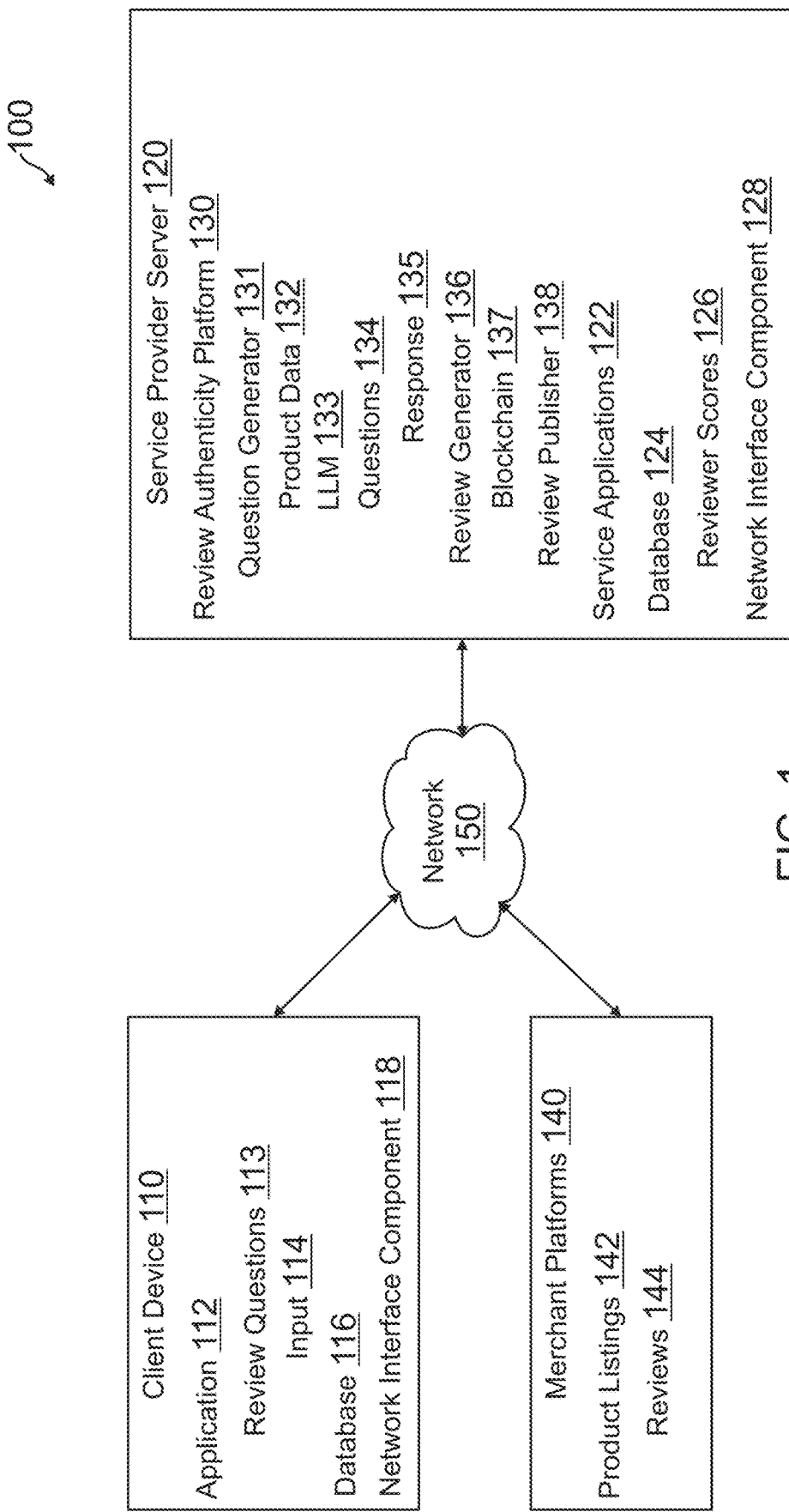
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for intelligent detection and acquisition of authentic product reviews for cross-platform availability. Systems suitable for practicing methods of the present disclosure are also provided.

In network communications including interactions between online platforms and systems of service providers and client devices of end users, service providers may provide computing services to users and other entities through computing architectures. This may include electronic transaction processing and/or other computing services that may be utilized with purchasing products (e.g., goods, services, and other items), such as user identification and/or authentication, risk analysis, payment and/or financial instrument processing or verification, merchant sales systems, and the like. Further, merchants may utilize the service provider's or their own platform to provide a marketplace and/or digital storefront where the merchant may advertise and offer products for sale. With such offers, the service provider and/or merchant may provide a product review and/or feedback system whereby purchasers of products may leave feedback and provide reviews that other users and potential purchasers may utilize when determining whether to purchase a product. Such systems enable purchasers of the product to provide real and authentic reviews that are helpful and informative to potential purchasers.

"Authentic" reviews or "authenticity" of reviews, as used herein, are reviews that provide feedback directly related and relevant to the product, whether positive or negative. Authentic reviews may therefore correspond to reviews of the products attributes, value, cost, intended use, and the like, as well as reviews that provide informative feedback on use, consumption of, and/or interaction with the product (e.g., how to use a product correctly or effectively). They may also include reviews that provide feedback regarding acquisition of the product, veracity of marketing and/or advertisement of the product (insofar as such advertisement may be related to product attributes and the review may provide feedback about such attributes, not a marketing campaign or message), and other information associated with acquiring and/or utilizing the product. Conversely, inauthentic or artificial reviews are reviews created with the intent to mislead customers, for fraudulent purposes, by users that do not know of or have experience with the product, and/or may be accidentally left for the incorrect product. Inauthentic reviews may also include reviews not specifically for the product but intended to review a service, merchant, or other ancillary object, action, company, or person associated with the product.

As customers, consumers, and other users utilize reviews for making purchasing decisions, fake, artificial, and/or inauthentic reviews may similarly mislead potential purchasers and negatively impact the validity of and trust users have in reviews and review systems, ratings, and feedback. If reviews are fake, then a user or potential buyer may mistakenly believe that a particular product is either good or bad when the actual experience of authentic purchases may be the converse. Identification of these fake reviews is arduous though, requiring manual efforts and review. Further, the fake reviews burden automated systems and data storages, leading to inefficient computing architectures and automated review processes. For example, a recent online travel agency was required to review millions of fake review submissions and manually remove them due to fake, artificial, and misleading information. Furthermore, regulatory requirements, laws, and company goals are requiring or guiding companies to combat fake reviews to improve consumer welfare.

To provide an automated system for intelligent detection and acquisition of authentic product reviews, a service provider may utilize an artificial intelligence (AI) processing pipeline and system to obtain user feedback using AI generated and solicited questions, queries, prompts, or statements, and process the responses to determine if a reviewer is authentic, e.g., if the user is a real purchaser of the product and leaving a review intended for providing positive or negative feedback of the products attributes, not for personal, financial, or business gain. For example, a large language model (LLM) or other machine learning (ML) system (including deep learning models and/or neural networks (NNs) may be utilized to automatically generate questions to a user for responses about the product that verify the user purchased the product, has utilized the product to a sufficient degree, has properly used the product (such as according to use instructions), and the product was not defective, such that the user is qualified to provide authentic feedback regarding the product. The AI processing pipeline and system may then authenticate the user's responses and review prior to posting and providing for availability to other users and/or merchants. If a valid review is created, the user's trust and authenticity with the reviewing platform and AI system may be improved, and the review may be persisted to a distributed record on a blockchain, another distributed ledger, or other platform. This ledger may then be utilized by different merchants to verify the authenticity of the review and automatically push reviews to other users during browsing and/or purchasing/checkout for products, which gives potential purchasers reviews they can trust and rely upon in deciding whether to purchase a specific product.

Based on authenticated reviews, a user may decide process a purchase transaction, such as for a payment to a merchant, through an online service provider. To do so, the user may pay for the transaction using a digital wallet or other account with the online service provider, such as a digital transaction processor (e.g., PayPal®). As such, the merchant may utilize these online service providers for particular computing services, such as to process transactions, create and/or login to accounts with the service provider and/or the merchant, provide risk analysis and/or fraud detection, and other computing services provided through applications, websites, resources, and processors of the service provider. Other service providers may also provide different services to other types of entities, such as computing services for social networking, microblogging, media sharing, messaging, business and consumer platforms, and the like.

In this regard, a service provider, such as an online transaction processor, may provide computing services to users and/or their corresponding entities, which may include end users and customers, merchant customers for an online transaction processor, businesses and their representatives and/or employees, and the like. In some embodiments, these computing services may include those associated with electronic transaction processing, payments, and/or cryptocurrency trading and payment processing. In order for users to utilize computing services of a service provider, the service provider (e.g., an online transaction processor, such as PAYPAL®) may require users and other entities requesting the services to have an account with the service provider. A user wishing to establish an account may first access the online service provider and request establishment of the account. Account and/or corresponding authentication information with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information.

The user may also be required to provide financial information, including payment card (e.g., credit/debit card) information, bank account information, gift card information, benefits/incentives, and/or financial investments. The user may also establish, purchase, trade, and/or store cryptocurrency for the account and/or digital wallet. This information, currency, and/or value may be used to process transactions for products. As such, the online payment provider may provide digital wallet services, which may offer financial services to send, store, and receive money, process financial instruments, and/or provide transaction histories, including tokenization of digital wallet data for transaction processing. The application or website of the service provider, such as PAYPAL® or other online payment provider, may provide payments and other transaction processing services. Once the account of a user is established with the service provider, the user may utilize the account via one or more computing devices, such as a personal computer, tablet computer, mobile smart phone, or the like. The user may engage in one or more online or virtual interactions that may be associated with electronic transaction processing, images, music, media content and/or streaming, video games, documents, social networking, media data sharing, microblogging, and the like. Similarly, the merchants may use the accounts when providing their merchant services to customers, such as during electronic transaction processing.

As such, users may utilize their accounts to purchase items and provide product reviews. Merchant (or other entities) may have and/or utilize software platforms, such as applications and websites, where these merchants may offer their products, services, and other items to users, such as customers and consumers. During the provision of such items, the merchant and/or service provider may provide users with processes to leave reviews and/or provide product feedback regarding purchased items. Further, the processes and review platforms may enable users to browse and read reviews of the products sold by the merchants. For example, merchants may sell items on a marketplace of the service provider or another entity, which may allow for the merchant to advertise their products and provide listings or sales offers for their products. When users submit their own reviews for other users, customers, and consumers to review, the marketplace may allow for the reviews to provide information to other users that may help them in deciding whether to purchase the product. However, not all reviews may be authentic, such as when reviews are submitted by fraudulent parties and/or merchants/sellers that leave misleading or false information intended to deceive other purchasers. Further, some users may maliciously or erroneously write and submit fake, artificial, or incorrect reviews, for example, if the user had a bad experience with the merchant unrelated to the product or if a user submits a review for the wrong product by mistake.

As such, the service provider may determine if the reviews are authentic by reviewing data for the reviews and the users submitting the reviews, as well as actively questioning the reviewers through an intelligent and automated process. For example, a user may want to leave a review for a product purchased from the merchant, or may initiate the process and provide initial feedback and review. To determine the authenticity of the review and the reviewer, such as to establish that the reviewer actually purchased and used, consumed, or otherwise has experience with the product and that the reviewer is leaving both a relevant and nonfraudulent review, the service provider may utilize an AI system and engine of a review authenticity platform to question the user, create the review, and evaluate the review's authenticity. The service provider may initially determine how a user may want to provide feedback, such as with a photo/video or for the product attributes of the products. Using one or more LLMs, conversational AIs, or other generative AIs of the AI system, the service provider's AI system may compare with the received text and/or the image/video (or other media content) associated with the product to determine if the user is actually reviewing the correct product. This allows AI system to identify the relevancy or irrelevancy of the review, such as whether the user is reviewing the product or some other product. For example, the reviewer may have purchased a gaming console and be providing a review for that product, but the review does not describe the gaming console and/or its attributes. As such, the AI system may determine that the review's authenticity may be required to be verified and evaluated to ensure that the review is proper and provides relevant and accurate information.

In order to determine if reviews are "real" reviews, the AI system may the provide the user leaving the review with questions to test the user and determine if the user is indeed a real user of the product. An LLM may be utilized with product information for the product and review information regarding the type of review that the user is attempting to leave to create AI generated questions based on the product description for the user to verify and provide relevant feedback and review information. For example, the description and information of the product from the merchant marketplace or other online sale offer may be used, as well as information and reviews for other similar products. The type of review being left (e.g., image, video, description of product attributes, etc.) may be user with the type of reviews that these products usually receive to determine the questions. The LLM may be prompted through one or more application programming interface (API) calls to intelligently and procedurally generate these questions, such as questions linked to the product and its features. The questions may also be AI generated based on the product image to verify if the user is reviewing the product or something else.

In this regard, the service provider may generate questions using a generative AI, such as an ML or other AI engine that implements a large language model (LLM), generative pre-trained transformer (GPT, such as ChatGPT), or the like, which may be used to provide conversational responses to queries and requests by users. A prompt may be provided to the generative AI, which may identify the product and review information and an instruction to generate questions. Once the questions are received, an automated chatbot or conversational AI may question the user. The AI system, LLM, or other conversational AI and/or natural language processor (NLP) may analyze and evaluate answers to the questions to identify and/or determine the product that is being reviewed and whether that product matches the one purported to be reviewed. To weed out the fake reviewers whose aim is to push up or down the review score, the AI system may ask more questions to determine if it is fake review or not, such as questions designed to elicit information regarding the user's use of the product, purchase of the product, and the like.

If a review is found to be a fake or artificial review, the AI system may ask the user to describe the product in greater detail to confirm the user's intent, falseness of review, and/or inauthenticity. These questions may be generated using the LLM, and answers to each question may be scored so that the combined scores may be used to determine if a review is fake or authentic. With authentic or fake reviews, a user's review quality score may increase or decrease, respectively, to provide an additional metric by which to evaluate whether the user is leaving fake reviews or can be trusted to provide authentic reviews. Further, to incentivize users to leave feedback and to answer questions or respond to requests for authenticating a review, each user may have a quality score and if they hit a certain number in a year, they may receive rewards, badges, identification as a valid/prominent reviewer, or other incentive. Scoring the users may be performed based on each review's quality, and users with a higher "trust level" may be flagged separately for their review influence and trustworthiness. As such, the review authenticity platform may also provide an incentive to motivate users to leave authentic reviews and to take the time to be authenticated for the review.

To provide feedback and reviews to other users once they have been verified for authenticity and legitimacy, a blockchain and distributed ledger of electronic records may be utilized. For example, records for individual or blocks of reviews may be persisted to the blockchain by writing the reviews to "blocks" or distributed records that are distributed over multiple devices or nodes of the blockchain. The ledger may be utilized to maintain integrity of the reviews and ensure their veracity. The records may be written as blocks for the specific product, which may be identified through a UPC (Universal Product Code) or another unique identifier. In some embodiments, writing to the blockchain and other blockchain activities may be limited to ecommerce institutional entities that may participate and share the role of a node to validate and approve the review additions to the block. Once the transaction and review are written to the block, the listener nodes or devices may be notified through an event and the record can be published to collected all the valuable feedback for the product on the blockchain as a single platform for review distribution and use with the product's advertisement, sale, or other informational activity.

Once reviews are generated and available, such as with a blockchain and distributed records, the system may dynamically inject recommendations/related reviews to merchants via an API for them to push to consumers during their online shopping experience. New product recommendations along with the reviews may be injected during an upsell opportunity, such as when other users browse the item for sale, engage in a checkout, and the like. The reviews may be retrieved from the blockchain records and may be sorted and presented based on the time since the review or other review parameter and/or factor. As such, too old of reviews may generally be discarded, especially if a newer version of the product is now being offered, or reviews may otherwise be culled, weighted, and/or prioritized. Merchants may be provided with interfaces and/or processes to inject any dynamic reviews before and/or during the browsing or checkout. During browsing or a checkout, if a customer is looking at reviews and the service provider knows that the customer is likely deciding based on the reviews, the service provider may also highlight positive, relevant, descriptive, or common keywords that may assist users in a buying decision.

Thus, by intelligently generating questions to check review authenticity by a generative AI, authentic reviews may be more quickly and efficiently captured with no or minimal human efforts and intervention. Further, the generative AI may provide a conversational output to the users for questioning and review acquisition without the need to have individual agents or other actors perform additional actions. As such, a NN or other ML/AI system may parse, analyze, and create reviews to ensure that other users are provided correct, legitimate, and helpful data. Further, a blockchain of records may be utilized to store data for reviews in an immutable and verified format so that the data may be quickly retrieved and provided to users in a predictive and trustworthy manner.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a client device 110, a service provider server 120, and merchant platforms 140 in communication over a network 150. Client device 110 may be utilized by an end user, including a valid purchaser of a product and/or customer of merchant platforms 140, or may instead be utilized by malicious users or other user that may not provide an authentic review of the product. Service provider server 120 may provide various data, operations, and other functions to client device 110 and/or merchant platforms 140 via network 150 for reviewing the product and/or ensuring that the user's product review is authentic. In this regard, client device 110 may respond to intelligently created questions from service provider server 120, which may be used to judge review authenticity. Service provider server 120 may interact with merchant platforms 140 to verify reviews and/or provide reviews and reviewer scores so that other users may receive authentic and helpful reviews during product research and/or purchasing.

Client device 110, service provider server 120, and/or merchant platforms 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Client device 110 may be implemented as a communication device that may utilize appropriate hardware and software configured for wired and/or wireless communication with service provider server 120 and/or merchant platforms 140. For example, client device 110 may be implemented as a personal computer (PC), a smart phone, laptop/tablet computer, wristwatch or wrist device with appropriate computer hardware resources, eyeglasses (e.g., GOOGLE GLASS®) or other type of wearable device with appropriate computer hardware, implantable communication devices, and/or other types of computing devices capable of transmitting and/or receiving data. Although only one device is shown, a plurality of devices may function similarly and/or be connected to provide the functionalities described herein.

Client device 110 of FIG. 1 contains an application 112, a database 116, and a network interface component 118. Application 112 may correspond to executable processes, procedures, and/or applications with associated hardware. Client device 110 may include additional or different modules having specialized hardware and/or software as required.

Application 112 may correspond to one or more processes to execute modules and associated components of client device 110 to provide a convenient interface to permit a user for client device 110 to browse and purchase products provided by merchants and/or service providers including those provided by service provider server 120 and/or merchant platforms 140, respectively. These product interactions may be used to purchase products, review products, and/or read or watch reviews of products. In this regard, application 112 may correspond to specialized hardware and/or software utilized by client device 110 that may access websites and/or application data and display such data allowing interaction with and/or navigation between webpages and/or application interfaces and other data. In some examples, application 112 may be used to provide transaction processing for products, such as through a user interface enabling the user to enter and/or view the products that the user associated with client device 110 wishes to get more information about and/or purchase. This may be based on transactions generated by application 112 using one or more merchant websites and/or marketplaces, where after purchase of a product, a user may utilize application 112 to provide feedback regarding the product, purchase, or other information.

To process transactions, application 112 may utilize user financial information, such as credit card data, bank account data, or other funding source data, as a payment instrument when providing payment information. Additionally, application 112 may utilize a digital wallet associated with an account with service provider server 120 as the payment instrument, for example, through accessing a digital wallet or account of a user through entry of authentication credentials and/or by providing a data token that allows for processing using the account. Application 112 may also be used to receive a receipt or other information based on transaction processing. However, different services may be provided via application 112, including social networking, media posting or sharing, microblogging, data browsing and searching, online shopping, and other services available through service provider server 120. Thus, application 112 may also correspond to different service applications and the like.

In various examples, application 112 may correspond to a general browser application configured to retrieve, present, and communicate information over the Internet (e.g., utilize resources on the World Wide Web) or a private network. For example, application 112 may provide a web browser, which may send and receive information over network 150, including retrieving website information, presenting the website information to the user, and/or communicating information to the website, including payment information for the transaction. However, application 112 may include a dedicated application of service provider server 120 or other entity (e.g., a merchant), which may be configured to output data via one or more user interfaces that allows a user to navigate between pages and/or interfaces.

Such websites and/or application interfaces may be used to provide product reviews, which may be solicited by service provider server 120 and verified for authenticity using automatically and intelligently generated questions, as discussed herein. For example, service provider server 120 may procedurally generate review questions 113 when application 112 is used to leave or create a review for a product. Review questions 113 may correspond to a questionnaire or other test, query, or request for feedback/answers, which may be generated for the product and based on the review and/or review type being provided via application 112. In response to review questions 113, a user using client device 110 may provide input 114, such as answers or other responses to review questions 113. Input 114 may be processed by service provider server 120 to determine whether the review is real, authentic, and/or nonfraudulent, as discussed herein. In some embodiments, application 112 may also be used to view reviews, such as during product browsing, purchasing, and/or checkout, as well as view reviewer scores and/or trustworthiness including reviewing and/or receiving incentives, bonuses, and/or badges for leaving authentic and/or useful reviews.

Client device 110 may further include or be associated with database 116, which may store various applications and data and be utilized during execution of various modules of client device 110. Database 116 may correspond to different types of data storage and components including cloud computing storage nodes, remote data stores and database systems, distributed database systems over network 150, and the like used to store various applications and data. Database 116 may include, for example, identifiers such as operating system registry entries, cookies associated with application 112 and/or other applications on client device 110, identifiers associated with hardware of client device 110, or other appropriate identifiers, such as identifiers used for payment/user/device authentication or identification, which may be communicated as identifying the user/client device 110 to service provider server 120.

Client device 110 includes network interface component 118 adapted to communicate with service provider server 120, merchant platforms 140, and/or other devices, servers, and components on network 150. Network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may provide services including account and electronic transaction processing services. In this regard, service provider server 120 includes one or more processing applications which may be configured to interact with client device 110 to provide AI generated questions, such as questions generated using an LLM or other generative AI, and process responses to determine review authenticity. In one example, service provider server 120 may be provided by PAYPAL®, Inc. of San Jose, CA, USA. However, in other examples, service provider server 120 may be maintained by or include another type of service provider.

Service provider server 120 of FIG. 1 includes a review authenticity platform 130, service applications 122, a database 124, and a network interface component 128. Review authenticity platform 130 and service applications 122 may correspond to executable processes, procedures, and/or applications with associated hardware. In other examples, service provider server 120 may include additional or different modules having specialized hardware and/or software as required.

Review authenticity platform 130 may correspond to one or more processes to execute modules and associated specialized hardware of service provider server 120 to provide a platform, application, and framework to generate and provide questions automatically using one or more AI models, such as an LLM and/or other generative AI, and process responses to determine review authenticity, which may be used for review persistence and user scoring, rating, and/or incentivizing. As such, questions for review generation and verification may be generated by an AI model in a conversational or natural language manner so that users may be queried or questioned using questionnaires or other sets of questions, which seek to identify whether users are providing both relevant and authentic feedback in their reviews. In this regard, review authenticity platform 130 may correspond to specialized hardware and/or software used by service provider server 120 to provide a question generator 131, which may be used with a review generator 136 to generate reviews based on responses to questions from question generator 131. A review publisher 138 may be used to publish and/or provide reviews generated and persisted in an immutable and/or trusted manner, such as stored in a trusted database and/or persisted in block or distributed record of a blockchain 137, which may be outside of, but accessible by, service provider server 120.

Initially, question generator 131 may receive a request to generate a review, evaluate and/or verify an authenticity of a review, and/or generate questions designed to elicit information regarding the review and/or the authenticity of the review. For example, a user may utilize application 112 on client device 110 to purchase a product and/or request to leave a review for the product. This may be done in response to a purchase, but a purchase may not necessarily be tied to the request to leave a review, such as when a user may visit a product page on a marketplace and attempt to leave a review or other feedback (e.g., a rating). In some embodiments, the user may request to leave feedback and a review;

however, the user may instead be requested to provide feedback for the review's automatic generation. In this regard, question generator 131 may initially determine the type of review and/or type of information being provided for the review, such as an image, video, audio, and/or description of the product's attributes or information (e.g., text). This may be based on the data being uploaded, the review flow or process, and/or a request by the user to provide the specific type of review and/or information.

Question generator 131 may further determine and/or access product data 132 for the product, which may include the product's attributes, sales, images, videos, other user reviews, or other content and information regarding the product. The review type and product data 132 (e.g., the review information for the review to be provided and the product information for determination of the products attributes and identification) may be used together to prompt LLM 133 or other generative AI to generate questions 134. LLM 133 may correspond to a language model that may be used for intelligent and procedural generation of natural language outputs for questions that may be used to evaluate, by LLM 133 and/or another AI model, whether responses 135 to questions 134 indicate that the review being provided is authentic (e.g., not fake, artificial, malicious, or fraudulent), as well as relevant to the product (e.g., not off-topic, about the merchant or seller of the product and not the product attributes, use, history, value, etc., or left by a non-purchaser or uninformed user).

The generation of questions by LLM 133 may be dependent on the prompts/queries that are fed into LLM 133, such as based on the review type or other information, product data 132, and/or instructions to generate questions 134 designed to elicit responses 135 for evaluating review authenticity. Such process for prompt generation and/or provision may be done manually or automatically. LLM 133 may learn from the teaching examples and/or the existing rules or documents. By utilizing the information, synthesizing, inference and generalization abilities of LLM 133 or other generative AI, such as small language models (SLMs), generative pretrained transformers (GPTs), and the like, the questions may be generated after prompting with the requirements and background of the instruction or other task.

LLM 133 may initially be trained and generated to have an SML/LLM, GPT, or other generative AI model that may provide conversational or chat interactions with prompts and requests from users and/or automated endpoints (e.g., applications or scripts that may automate prompting for question generation). However, to specifically tailor LLM 133 to the tasks for rule violation generation required by service provider server 130, LLM 133 may be configured, tuned, and/or further trained using domain-specific and/or specialized knowledge including knowledge associated with fake, false, or artificial reviews. LLMs may utilize deep learning models or other NNs or ML models for conversational and natural language purposes. In this regard, LLM 133 and/or other ML or AI models of question generator 131 and/or review generator 136 may utilize different ML techniques for intelligent decision-making, classifications, predictions, and other outputs.

For the ML techniques, ML models and/or NNs may be used, including decision trees, deep learning models, and the like. Decision trees may include one or more input nodes or other mathematical computations associated with features, additional or hidden processing nodes, and output nodes that form branches where different computations at each node, activation functions, thresholds or value computations and comparisons, and the like may be used to proceed down different branches to a particular output. Similarly, deep learning NNs may use nodes linked in different layers to form neurons that may include input, hidden, and output layers. ML models with multiple layers, including an input layer, one or more hidden layers, and an output layer having one or more nodes, may be used. Each node within a layer is connected to a node within an adjacent layer, where a set of input values may be used to generate one or more output values or classifications. Within the input layer, each node may correspond to a distinct attribute or input data type that is used for the ML model algorithms using feature or attribute extraction for input data.

Thereafter, the internal, interceding, or hidden layers and/or nodes may be generated with these attributes and corresponding weights using an ML or deep learning algorithm, computation, and/or technique. For example, each of the nodes in the hidden or internal layers generates a representation, which may include a mathematical ML or NN computation (or algorithm) that produces a value based on the input values of the input nodes. The algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node to produce one or more output values that provide an output, classification, prediction, or the like. Thus, when the ML or NN model is used to perform a predictive analysis and output, the input may provide a corresponding output based on the trained classifications.

By providing input data when training a deep learning NN, the nodes in the layers may be adjusted such that an optimal output (e.g., a classification) is produced in the output layer. By continuously providing different sets of data and penalizing the NN when the output of the NN is incorrect (e.g., rules are not determined to be similar), the NN (and specifically, the representations of the nodes in the layers, branches, neurons, or the like) may be adjusted to improve its performance in data classification. Question generator 131 may therefore use LLM 133 employing one or more of these models for natural language responses and outputs based on a knowledge base to generate questions 134 including review questions 113 provided in application 112. Responses 135 may be received in response to questions 134, which may include input 114 from application 112.

Review generator 136 may then process responses 135, such as input 114 for the review being provided via application 112, to determine if the reviews are authentic and/or relevant. For example, authenticity of a rule may be evaluated for whether the rule aligns with what is known for the product, whether the user is a purchaser and/or has experience with using, consuming, and/or possessing the product, and/or whether the user is not acting fraudulently or maliciously by leaving an otherwise good or bad review when not warranted for the product. Authenticity may be evaluated using an NLP and/or LLM 133, such as by processing text data to determine a user sentiment and/or user responses and determining if that aligns with the known product attributes and information and/or prior reviews from product data 132. Additionally, relevance may be determined based on whether the review is actually for the product and not instead directed to the merchant, another product, or an entirely different topic. In this regard, authenticity and/or relevancy may be determined by first scoring a user's response for authenticity and/or relevancy, for example, using a sentiment analysis of the user's response. Using the scores, authenticity and/or relevancy may then be computed or determined by comparing the scores to a threshold score that indicates whether the review is authentic and/or relevant (e.g., if at/meeting or above/exceeding the threshold, or inauthentic or irrelevant if at or below the threshold). Scoring may be performed by one or more ML models including LLM 133.

If a review is found to be authentic and relevant, then the review may be allowed to be generated, and then posted and published for the product. In this regard, review generator 136 may generate the review automatically using LLM 133 or other generative AI, which may include utilizing an NLP and conversational AI to create text from responses 135. The review may then be posted or provided to a page or other resource linked to the product where other users may view and read, watch, or otherwise consume the review. A score or rating for the product may also be affected. Further, review generator 136 may publish the review to blockchain 138 by creating a digital record for a distributed digital ledger of blockchain 138 and distributing the record to the nodes for persistence, recordation, and verification on blockchain 138. Writing to blockchain 138 may be limited to service provider server 120 and/or other trusted merchants and reviewers to verify review authenticity once stored and recorded to a record. Review publisher 138 may then use blockchain 138 to push, publish, or transmit reviews to other users and/or on other platforms, such as when an interaction with the product is detected. In this regard, on detection of another user browsing the product, selecting the product for purchase and/or requesting information about the product, and/or performing a checkout for the product or other similar or related products, records from blockchain 138 may be used to provide the review to the other user and/or another platform.

Service applications 122 may correspond to one or more processes to execute modules and associated specialized hardware of service provider server 120 to process a transaction or provide another computing service, which may be assisted by review authenticity platform 130 for review generation and verification. In this regard, service applications 122 may correspond to specialized hardware and/or software used by a user associated with client device 110 to establish a payment account and/or digital wallet, which may be used to generate and provide data to the user, as well as process transactions. Financial information may be stored to the account, such as account/card numbers and information. A digital token for the account/wallet may be used to send and process payments, for example, through an interface provided by service provider server 120. The financial information may also be used to establish a payment account. Accounts may be accessed and/or used through one or more instances of a web browser application and/or dedicated software application executed by client device 110 and engage in computing services provided by service applications 122.

The account may be accessed and/or used through a browser application and/or dedicated payment application executed by client device 110 and engage in transaction processing through service applications 122. Service applications 122 may process the payment and may provide a transaction history to client device 110 for transaction authorization, approval, or denial. Such account services, account setup, authentication, electronic transaction processing, and other services of service applications 122 may be utilized with product purchases and/or may include products themselves (e.g., financial services, accounts, payment instruments, etc.), which may be reviewed by users. As such, review authenticity platform 130 may be used with service applications 122 to provide users, merchants, and/or other entities with a process to review transactions processed through service applications 122, products provided by service applications 122, and the like. Service applications 122 may also provide different computing services, including social networking, microblogging, media sharing, messaging, business and consumer platforms, etc.

Service applications 122 may also provide additional features to service provider server 120. For example, service applications 122 may include security applications for implementing server-side security features, programmatic client applications for interfacing with appropriate application programming interfaces (APIs) over network 150, or other types of applications. Service applications 122 may contain software programs, executable by a processor, including one or more GUIs and the like, configured to provide an interface to the user when accessing service provider server 120, where the user or other users may interact with the GUI to more easily view and communicate information. Service applications 122 may include additional connection and/or communication applications, which may be utilized to communicate information to over network 150.

Additionally, service provider server 120 includes or is associated with a database 124 or other data storage component. Database 124 may store various identifiers associated with client device 110. Database 124 may also store account data, including payment instruments and authentication credentials, as well as transaction processing histories and data for processed transactions. Database 124 may store financial information and tokenization data. Although database 124 is shown as residing on service provider server 120 as a database, in other examples, other types of data storage and components may be used including cloud computing storage nodes, remote data stores and database systems, distributed database systems over network 150 and/or of a computing system associated with service provider server 120, and the like.

Service provider server 120 may include at least one network interface component 128 adapted to communicate client device 110, merchant platforms 140, and/or other devices or servers over network 150. Network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Merchant platforms 140 may be maintained, for example, by merchants and other online entities that may provide products to users, such as items and services, for sale, which may be advertised, listed, and/or marketed for sale based on reviews and/or to include reviews on one or more product pages, listings, or user interfaces. In this regard, merchant platforms 140 may offer products to users, such as items and services for sale, through the use of the computing services of service provider server 130 including transaction processing via service applications 122 and/or product review through review authenticity platform 130. In one example, merchant platforms 140 may be provided by merchants including merchant marketplace providers that allow multiple merchants to offer products for sale. However, in other embodiments, merchant platforms 140 may correspond to another type of entity that may have and/or utilize a software platform where reviews may be posted, solicited, aggregated, and/or provided for product review and comparison.

One or more of merchant platforms 140 may provide an online digital platform where users may access data for a merchant or other entity via an application, such as a resident software application and/or a browser application. In this regard, merchant platforms 140 may correspond to specialized hardware and/or software that may deploy and provide merchant platforms 140 over network 150 for access by client device 110, service provider server 120, and/or other devices and servers. In some embodiments, merchant platforms 140 may be used to offer and/or provide products for sale, such as items and/or services. However, other types of platforms, data, and the like may also be provided over network 150 to client device 110 and other devices and servers. Merchant platforms 140 may provide features, services, and other operations to customers of a merchant, which may include merchant sales operations, POS device processing and/or operations, online merchant marketplaces, sales and inventory services, and the like. Merchant platforms 140 may provide and/or process items for sale with client device 150 and/or a user interacting with merchant platforms 140 via client device 110 and/or another computing device (e.g., a POS device, etc.). In certain examples, merchant platforms 140 may be accessible over the Internet and provide for sales with client device 110 over network 150. To provide sales and/or list products for sale, merchant platforms 140 may provide product listings 142, which may be associated with reviews 144 including reviews generated by review generator 136 based on questions 134 from question generator 131 and responses 135, as well as reviews from blockchain 137 that may be provided and/or pushed to users when users browse product listings 142, select items for purchase from product listings 142, and/or engage in checkout processes on merchant platforms 140.

In some embodiments, merchant platforms 140 may correspond to and/or be used to configure a checkout application at a physical merchant location, such as the application(s) of a point-of-sale (POS) device used to provide sales at physical locations. For example, merchant platforms 140 may be used to establish a transaction once a user has selected one or more items for purchase and/or entered the item(s) to the transaction for processing. Establishment of the transaction may include use of product listings 142 and may be based on reviews 144, or reviews 144 may be provided during transaction establishment and/or generation for product listings 142. Once a payment amount is determined for the item(s) to be purchased by the user, merchant platforms 140 may request payment for the transaction. Payment may be provided using electronic transaction processing services enabled and/or provided to merchant platforms 140. After receipt of payment and/or confirmation of the payment, merchant platforms 140 may then process a payment to the merchant associated with merchant platforms 140. Thereafter, merchant platforms 140 may be used to submit and/or request to submit reviews 144, such as by reviewing a product that a user may have purchase and/or that the user may have located in product listings 142. As such, review authenticity platform 130 may be used to generate reviews, provide questions 134 for review generation, and/or verify an authenticity of reviews based on responses 135.

In some embodiments, merchant platforms 140 may be used to host, provide, and/or access and maintain a website of the merchant, a web-based application, or the like. The website may be operated, hosted, updated, and provided to end user devices and other systems or servers. The website may correspond to a hosted website having webpages where customers and service providers may browse product listings 142 provided by a corresponding merchant, engage in electronic transaction processing, provide reviews, and the like. The website may be provided through one or more webpages having of Hypertext Markup Language (HTML) code, Extensible Markup Language (XML) code, JavaScript code, and/or Cascading Style Sheets (CSS). In other embodiments, merchant platforms 140 may provide data for an application that may be installed on client devices of users and used to access the merchant's data, marketplace, items, and the like.

Network 150 may be implemented as a single network or a combination of multiple networks. For example, network 150 may include the Internet or one or more intranets, landline networks, wireless networks, and/or other appropriate types of networks. Network 150 may correspond to small scale communication networks, such as a private or local area network, or a larger scale network, such as a wide area network or the Internet, accessible by the various components of system 100.

Figure 2A:
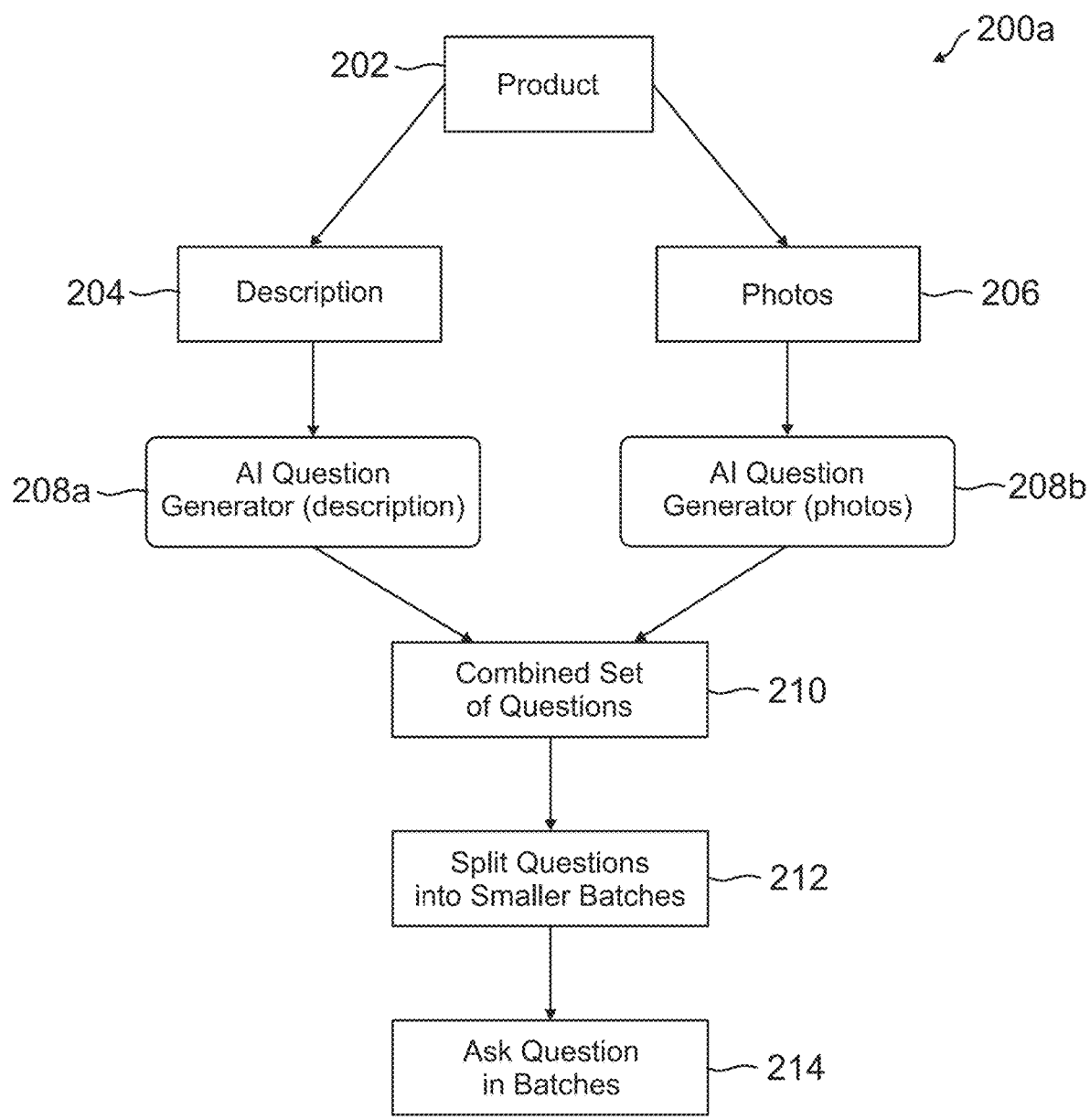
FIGS. 2A and 2B are exemplary diagrams for generating questions to evaluate review authenticity and processing responses from users using an AI system, according to an embodiment.
Figure 2B:
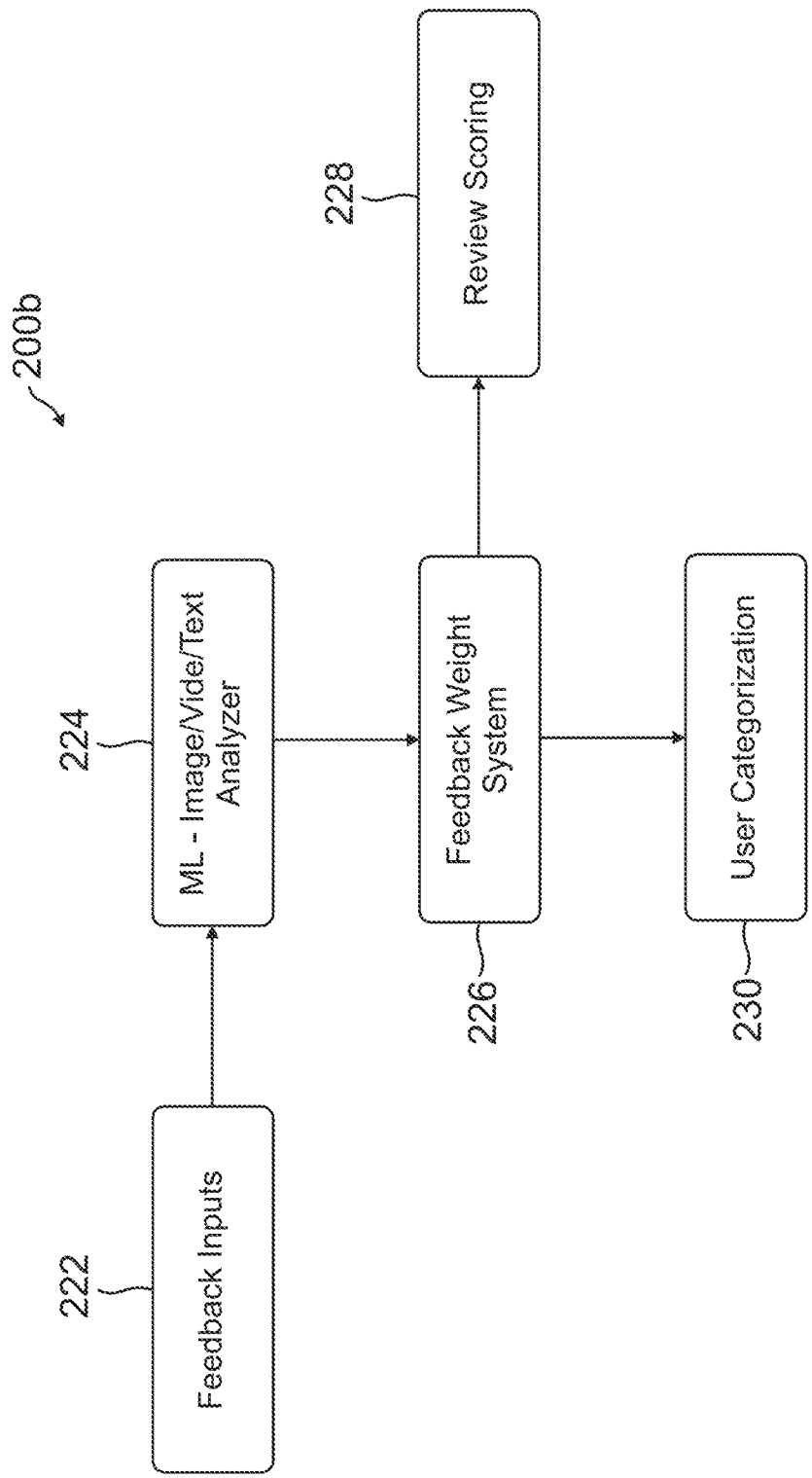

FIGS. 2A and 2B are exemplary diagrams 200a and 200b for generating questions to evaluate review authenticity and processing responses from users using an AI system, according to an embodiment. Diagrams 200a and 200b of FIGS. 2A and 2B include processes performed by a service provider, such as an LLM or other AI system using a generative AI and deep learning model, for question generation and answer scoring to determine review authenticity, for example, using review authenticity platform 130 of service provider server 120 in system 100 of FIG. 1. In this regard, diagram 200a demonstrates a processing flow to generate and ask a user questions designed to elicit responses that may be evaluated for review authenticity, while diagram 200b demonstrates a processing flow to evaluate responses for review generation and/or verification.

In diagram 200a, initially a product 202 is reviewed, selected, or identified from a recent purchase by a user. A user may visit a product page, such as a webpage or posting in an application, where product 202 may be reviewed, or the user may have purchased product 202 and a review may be solicited from the user. In either event, the user may attempt to leave feedback in one or more forms, such as a type of review that the user wants to provide. For example, a review may correspond to a description 204 and/or photos 206 (which can include other media such as videos, etc.). If an audio review is provided, the audio can be converted to a text description. The user may provide either description 204, such as feedback regarding product attributes including quality, purpose, usefulness, value, cost, etc., or photos 206, or may provide both. As such, questions may be generated for either or both depending on the type of review to be provided.

In this regard, a service provider may generate questions using AI question generators 208a and/or 208b, which may each or collectively utilize an LLM or other generative AI. In this regard, the questions may be designed to determine if description 204 and/or photos 206 compare and match with the text and/or images, respectively, of the actual product. Note that if an audio review has been converted to a text description, AI question generator 208a can be used to do the comparing and matching. Initially, AI question generators 208a or 208b may generate questions to determine the relevancy or irrelevancy of a review. For example, the questions may be generated to determine if the user is reviewing the correct product, as well as if the user is indeed a real user of the product. AI question generator 208*a* may generate questions for description 204 that have the user identify the product based on a product description from the merchant, store, marketplace, or the like, as well as those descriptions of similar products and their features. Similarly, AI question generator 208*b* may utilize a product image to determine if the user is providing photos 206 of the same product, such as if the photos match or if the product can be identified in photos 206. An AI model, such as an LLM or NLP model for description 204 or an image detection ML model for photos 206, may be used to determine the relevancy of the review being provided for product 202.

AI question generators 208*a* and/or 208*b* may further generate further questions to determine if a review is a fake review, such as if it is malicious, fraudulent, or provided for purposes other than giving informative product feedback. In this regard, AI question generators 208*a* and/or 208*b* may create questions to have the user describe the product, the user's experience with the product, the user's purchase of the product, and other information that a real purchaser would have of the product. A combined set of questions 210 from AI question generators 208*a* and/or 208*b* may be created and may be provided to the user for reviewing product 202. In this regard, the user may be questioned in smaller batches 212, which may be done so that the review and/or questioning may be ended if irrelevancy and/or inauthenticity is detected. As such, a questionnaire or other test may be provided using smaller batches 212 of combined set of questions 210 to avoid unnecessary questions, which saves computing resources and time in processing answers to those unnecessary questions.

As such, a questioning in batches 214 is performed and answers or responses are evaluated by an AI engine configured to determine whether the user's feedback is relevant and authentic. Questioning in batches 214 may include providing subsets of combined set of questions 210 that have been split into smaller batches until a criteria is met for authenticity, as discussed in diagram 200*b* for scoring of the user's responses. As such, the user may not be overwhelmed by many questions at once, and instead may respond in batches if authenticity is not verifiable, as the system may limit the usage of computing resources in handling responses.

Referring now to diagram 200*b* in FIG. 2B, the response scoring and review generation is shown. A score for relevancy and authenticity may be generated based on feedback inputs 222 using an ML analyzer 224 (e.g., for image, video, text, etc.), and the score may be combined, as well as weighted in some embodiments, so that the score may be compared to a threshold to determine if the review is authentic. Feedback inputs 222 are provided back into the system as text, images, videos, etc., and are collected and normalized for further processing. As such, ML analyzer 224 may process feedback inputs 222 to identify the authenticity and relevance of the review generated. A feedback weightage system 226 may be used to weight different responses. For example, images/video of the user using the product may be weighted higher than a description in a few words. As such, feedback weightage system 226 may provide weights to the type of review and/or feedback provided by the user. Further, an image of the product that includes an aspect of the user may be weighted more heavily, which is greater evidence the user has the product in hand. Aspects may include location information, background images, and the like. In addition, stock images of the product may be weighted very little or not at all and may require additional questions.

A review scoring 228 may be performed by ML analyzer 224 using feedback weightage system 226. Review scoring 228 may score the reviews and users based on the review quality, which may utilize one or more ML models that analyze the content of the responses from the user. For example, an LLM or an ML model may be configured to process text, images, or the like, and score those for relevancy and authenticity based on known data for the product, reviews, and the like. If authentic and relevant, the review may be generated, and a user review quality score may be increased or otherwise improved. The review may also be persisted to a blockchain record for publishing, sharing, and/or distribution. However, if not, the user review quality score may be decreased, the user banned, blacklisted, or warned, and/or the review may be deleted.

When scoring users with review scoring 228, user may be provided a trust level, which allows other users to view and determine their trustworthiness when reviewing products. Further, users may be flagged as "influencers" when they are particularly trustworthy, which may motivate users to provide authentic reviews. This also may be utilized with feedback weightage system 226, where users may be categorized for their valuable inputs and weighted accordingly when providing reviews. When the reviews are persisted to a blockchain, the reviewers may receive blockchain badges and scores so that when reviews are published, other reviewers may view the reviewers badges, scores, and the like.

Figure 3A:
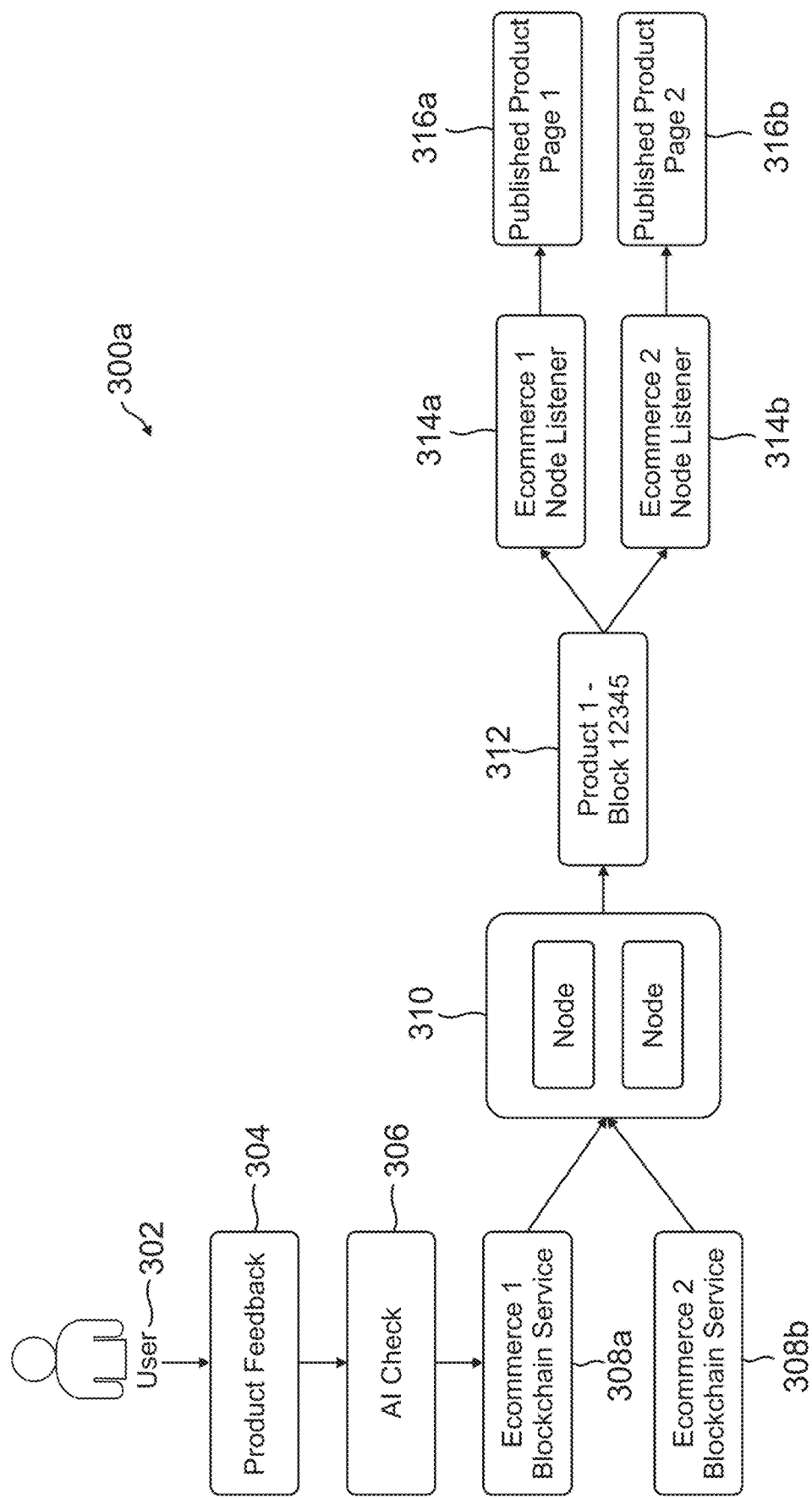
FIGS. 3A and 3B are exemplary diagrams for persisting authentic reviews to a blockchain for review distribution and providing those reviews using the blockchain when interactions with products by users are detected, according to an embodiment.
Figure 3B:
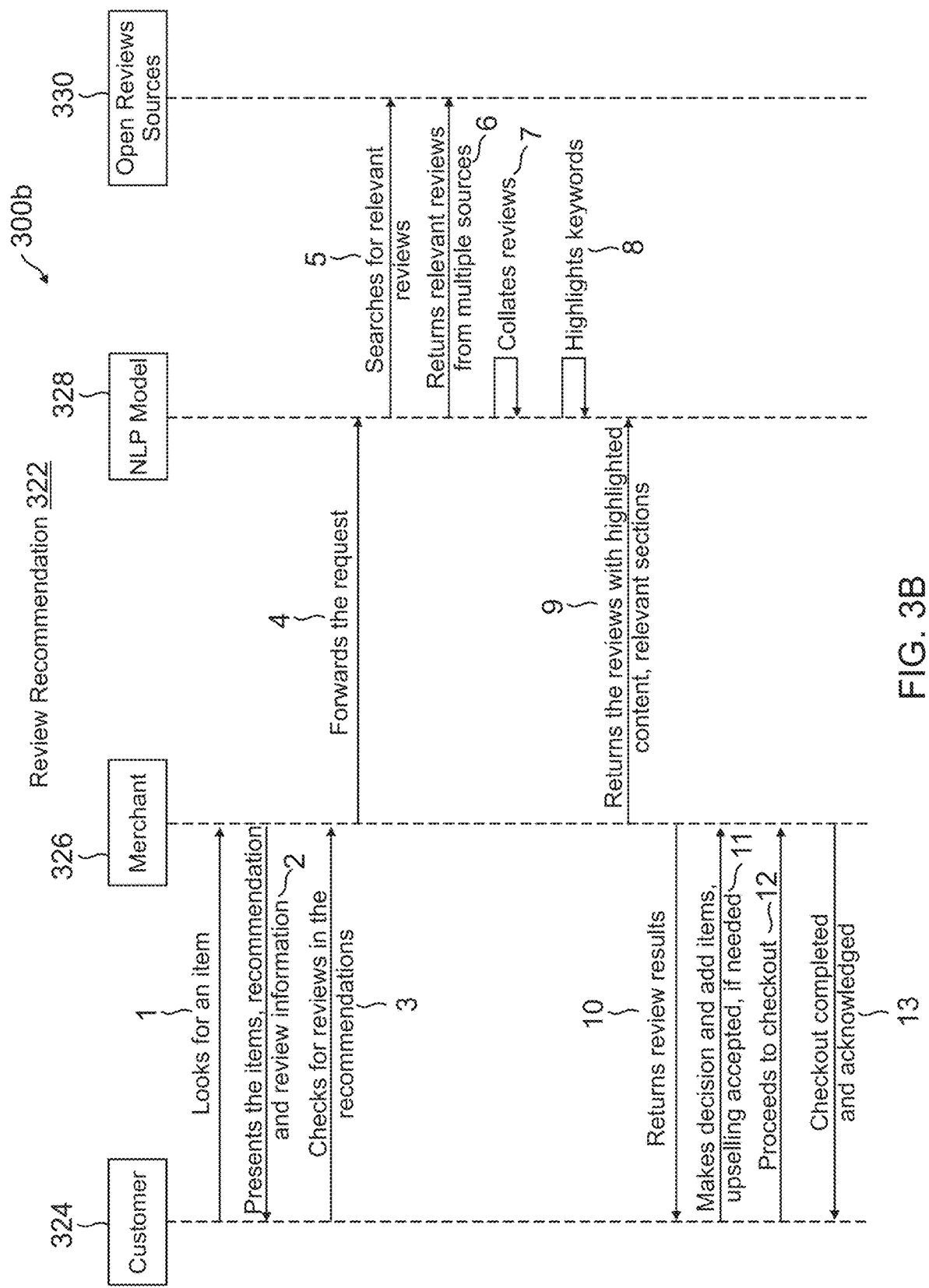

FIGS. 3A and 3B are exemplary diagrams 300*a* and 300*b* for persisting authentic reviews to a blockchain for review distribution and providing those reviews using the blockchain when interactions with products by users are detected, according to an embodiment. Diagrams 300*a* and 300*b* include processing flows for review publishing and use after determining an authenticity of the review, which may be performed by review generator 136 and/or review publisher 138 of service provider server 120 in system 100 of FIG. 1. For example, diagram 300*a* shows a process by which review generator 136 may persist authentic reviews to a blockchain for distribution, while diagram 300*b* shows a process by which authentic reviews from that blockchain may be presented to users during interactions with products and/or checkouts.

Referring now to diagram 300*a*, initially a user 302 provides product feedback 304, which may be analyzed for authenticity as discussed with regard to FIGS. 2A and 2B. As such, an AI check 306 of product feedback 304 is performed, which may determine the review's authenticity and relevancy. Once legitimacy of product feedback 304 from user 302 is confirmed by AI check 306, product feedback 304 and/or the corresponding review may be submitted to be written to an ecommerce blockchain service 308*a*, which may correspond to a computing service that enables registered and/or authorized ecommerce entities to write to a blockchain and distributed record ledger of digital records managed by multiple different nodes (e.g., computing devices, servers, machines or machine pools, cloud computes, etc.). Ecommerce blockchain service 308*a* may provide a blockchain where reviews that are authentic may be published and stored in a trusted manner. Each block may be written to the blockchain for one or more records for a product, which may be identified using the product's UPC or other identifier. Only those registered and/or authorized entities may be allowed to participate and share the role of a node to validate and approve the addition of new blocks to the blockchain.

Ecommerce blockchain service 308*a* may work with one or more other services and/or entities, such as an ecommerce blockchain service 308b, to manage and maintain a blockchain 310 over multiple different nodes or other distributed computing devices, servers, etc. As such, ecommerce blockchain services 308a and 308b may together write to and add blocks for new records for authentic reviews to blockchain 310. As such, a new product block 312 (e.g., block 12345 or other identifier for the product's UPC, the block's number, and/or other information) may be generated for distribution and recordation/publication on blockchain 310. New product block 312 may be written to the block for persistence and network consensus. Ecommerce node listeners 314a and 314b may be used to publish the review and allow different platforms to provide and utilize the review for the product. For example, new product block 312, the corresponding review, and/or the event for writing new product block 312 to blockchain 310 may be transmitted to ecommerce node listeners 314a and 314b, which may correspond to nodes of the blockchain that listen for block events and update/maintain records on the blockchain with corresponding ecommerce platforms. Thus, ecommerce node listeners 314a and 314b may publish the review on product page 1 316a with an ecommerce platform and/or product page 2 316b with another ecommerce platform. Reviews may be published automatically, on request, or on detection of an event, such as a user inquire, browsing session, or checkout, on product page 1 316a and/or product page 2 316b.

Referring now to FIG. 3B, diagram 300b represents a review recommendation process where reviews may be provided automatically to users after being written to a blockchain. For a review recommendation 322, initially a customer 324 may look for an item at step 1, where customer 324 may browse products, including items and services, from a merchant 326. At step 2, merchant 326 may present the item to customer 324 with a recommendation and review information enabling customer 324 to request and check reviews. As such, at step 3, customer 324 checks for reviews in the recommendations, which is transmitted back to merchant 326 for review retrieval and population in one or more user interfaces viewable by customer 324.

At step 4, merchant 326 forwards the request for the review to an NLP model 328, which may utilize natural language from the product's description, title, name, or the like to identify the product and its reviews. NLP model 328 may correspond to an ML model including LLMs, which may be trained and configured specifically to search for products using text or other data for the product (including images where NLP model 328 may further be associated with an image recognition or processing ML model). At step 5, NLP model 328 performs one or more searches for relevant reviews from open review sources 330, which may include blockchain records of reviews once authenticity has been verified of those reviews. As such, blockchain reviews, such as from blockchain 310 in diagram 300a, may be searched and may be used to dynamically inject reviews to merchant 326 via one or more APIs that allow merchant 326 to push the reviews to customer 324 during checkout, review request, product browsing, and the like. Results from open review sources 330 are returned to NLP model 328, at step 6, and NLP model 328 collates the reviews at step 7. Further, NLP model 328 performs a highlighting of relevant terms at step 8 so that customer 324 may more quickly and easily review relevant information needed for the item and/or purchase.

At step 9, NLP model 328 returns the reviews with highlighted content and relevant sections. The reviews may also be sorted and presented based on time or other parameter based on the collating performed by NLP model 328, which may include discarding outdated or irrelevant reviews. As such, merchant 326 returns the review results at step 10, which allows customer 324 to browse the reviews and determine information for the item or other product that the user is browsing or considering purchasing. Along with review presentation, at step 10, customer 324 may make decisions on purchases and enter a checkout flow or process, where dynamic injection of recommendations is be performed based on upsell opportunities. Merchants may automatically inject reviews for upselling or may be provided one or more options or interfaces to accept the review injection for upsell opportunities. As such, at step 12, the customer proceeds to checkout based on the received reviews, and at step 13, a checkout is completed and acknowledged by merchant 326 with customer 324.

Figure 4:
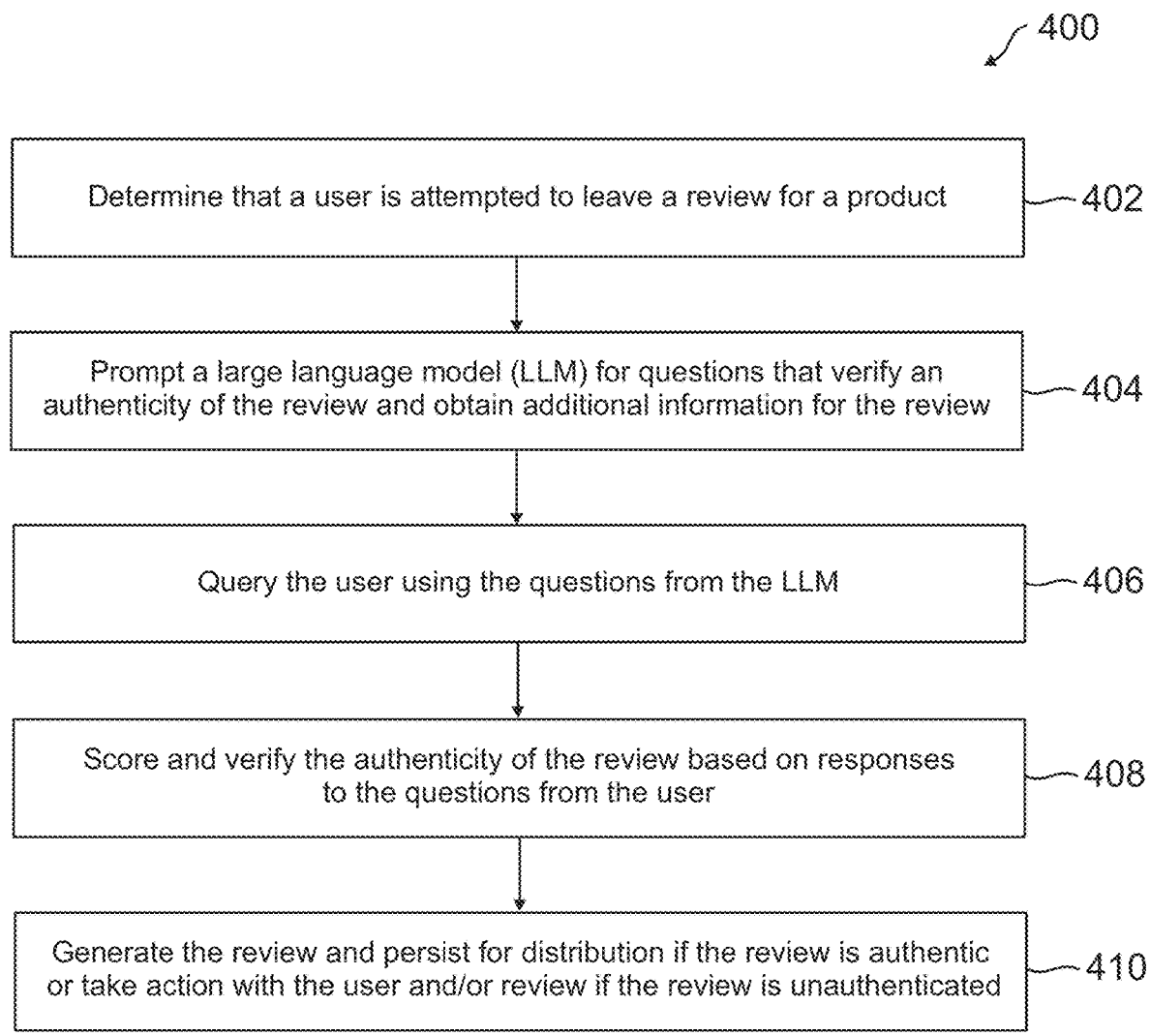
FIG. 4 is a flowchart of an exemplary process for intelligent detection and acquisition of authentic product reviews for cross-platform availability, according to an embodiment.

FIG. 4 is a flowchart 400 of an exemplary process for intelligent detection and acquisition of authentic product reviews for cross-platform availability, according to an embodiment. Note that one or more steps, processes, and methods described herein of flowchart 400 may be omitted, performed in a different sequence, or combined as desired or appropriate. Flowchart 400 of FIG. 4 includes operations the system performs for generating and verifying authenticity of reviews of products, as discussed in reference to FIGS. 1-3B above. In some embodiments, flowchart 400 may be performed by one or more computing devices, servers, and/or components discussed in system 100 of FIG. 1.

At step 402 of flowchart 400, it is determined that a user is attempting to leave a review for a product. For example, client device 110 in system 100 of FIG. 1 may visit one or more of merchant platforms 140 and attempt to leave a review for one or more of product listings 142, or, in other embodiments, the user may have completed a purchase for one or more of product listings 142 and a review may be solicited automatically. As such, service provider server 120 may utilize review authenticity review 130 to determine an authenticity of the review and/or solicit, generate, and validate that a review is authentic when the user provides feedback for the review via client device 110.

At step 404, an LLM is prompted for questions that verify an authenticity of the review and obtain additional information for the review. LLM 133 in system 100 of FIG. 1 may be trained on a corpus of documents and/or other knowledge base to provide natural language and/or conversational responses to prompts or other instructions. The instructions may be based on product data 132, as well as any additional review information including a type of review or the like that is being provided by the user. LLM 133 may correspond to an LLM, GPT, or other conversational AI may respond to prompts with instructions to create questions based on product data 132 with the review information. The responses may be questions 134 procedurally generated to test the user on whether the user has knowledge of and experience with the product, whether the user is leaving a relevant review, and/or whether the user is providing a legitimate and authentic review (e.g., not false, misleading, fraudulent, for personal or financial gain including to improve their business or sales, not malicious, etc.).

Prompts may be provided as input to LLM 133, which queries or requests generation of questions 134. LLM 133 may output questions 134, which may be designed to obtain responses 135 from the user. Responses 135 may be in the form or questions or queries, but may also correspond to statements or requests for actions for the user to perform or data for the user to provide. As such, questions 134 may correspond to a questionnaire, test, or the like, which the user may be required to complete in order to verify the authenticity of a review and/or obtain sufficient information regarding the review. Questions 134 may be generated, and responses 135 obtained, in a manner by LLM 133 to enable judging of the authenticity of the review, such as by processing using an NLP, LLM 133, and/or ML model to generate a score and evaluating the score against threshold scores. As such, responses 135 may be elicited by questions 134 in a manner that enables scoring, and as such, LLM 133 may be prompted and/or may generate questions 134 in such a manner including text responses, multiple choice, scoring or rating, etc.

At step 406, the user is queried using the questions from the LLM. The user may be provided with a questionnaire or other test that requests the user to respond to questions 134 with responses 135, which allow for evaluating of review authenticity. In this regard, application 112 on client device 110 may output and/or display review questions 113 from service provider server 120, such as when review authenticity platform 130 provides the questions directly to client device 110 and/or through merchant platforms 140. Client device 110 may be used to provide input 114, which may be transmitted to service provider server 120 for processing using review generator 136.

At step 408, the authenticity of the review is scored and verified based on responses to the questions from the user. Responses 135, such as input 114 from client device 110, may be processed by review generator 136 to determine an authenticity of the review being provided. In this regard, responses 135 may be score based on their text input, selections, and the like. For example, with text input, an NLP, ML model, and/or LLM 133 may be used to score the text by the user for authenticity. Responses 135 may also be clustered to compare to authentic/inauthentic reviews, or otherwise evaluated.

At step 410, the review is generated and persisted for distribution if the review is authentic or take action with the user and/or review if the review is unauthenticated. In this regard, review generator 136 may be used to authentic reviews 144 and/or generate reviews 144 when the feedback and input for the reviews is determined to be authentic. As such, review generator 136 may utilize LLM 133 or other generative AI to generate a review from input 114 and/or other data of responses 135. With generating the review, review generator 136 may create a block or distributed record for blockchain 137 and provide the block, along with a certification, digital signature, authorization key or encryption, and/or the like, to blockchain for persistence and storage across the distributed nodes and computing devices. Blockchain 137 may be used to push or provide reviews 144 to other users interacting with the corresponding products by review publisher 138. Further, the user may receive incentives, rewards, and/or a trustworthiness scoring or rating to indicate the user's trustworthiness of their reviews and authenticity of product feedback.

As discussed above and further emphasized here, flowchart 400 of FIG. 4 may be executed by service provider server 120 when generating questions using an LLM or other generative AI to determine review authenticity, which examples should not be used to unduly limit the scope of the claims. One of ordinary skill in the art would recognize many variations, alternatives, and modifications.

Figure 5:
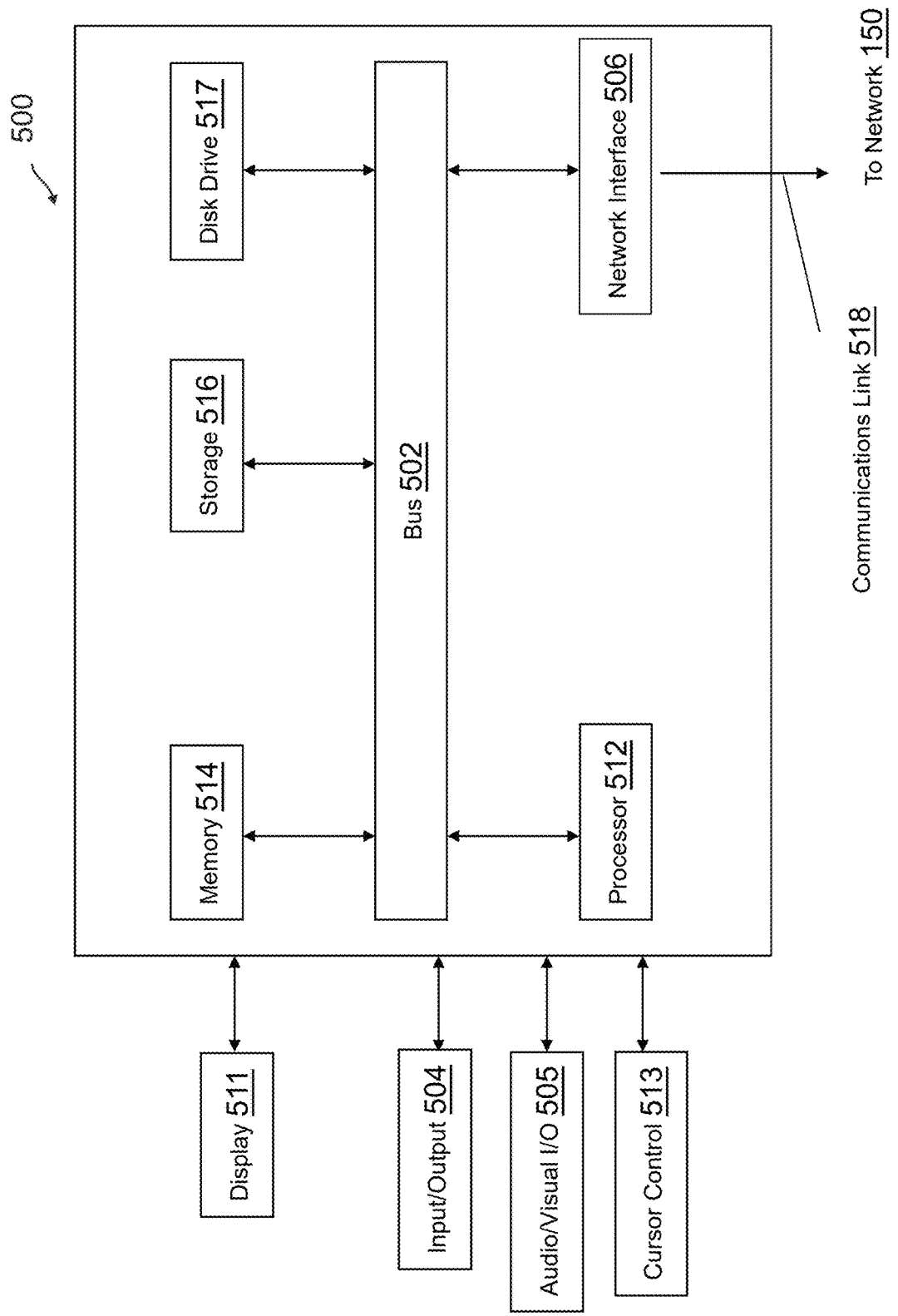
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
   detecting that a user is attempting to provide a review of a product from a merchant;
   determining product information for the product and review information for the review being provided by the user, wherein the review information includes a type of the review being provided by the user;
   executing one or more calls to a large language model (LLM) based on the product information and the review information, wherein the executing the one or more calls comprises prompting the LLM for questions that verify an authenticity of the review and obtain additional review information from the user for the review;
   generating a set of the questions for the user using the LLM and based on the executing the one or more calls;
   requesting one or more responses to the set of the questions from the user; and
   determining whether to generate the review for the product based on the one or more responses.

2. The method of claim 1, wherein, prior to the determining the product information and the review information, the method further comprises:
   requesting the type of the review from the user, wherein the type comprises one of an image or a video of the product or a description of a use or an attribute of the product.

3. The method of claim 1, wherein, prior to the determining the product information and the review information, the method further comprises:
   determining that the review applies to the product and that the user has previously used or purchased the product.

4. The method of claim 1, wherein, prior to the executing the one or more calls, the method further comprises:
   determining a portion of the product information not reviewed by the user in the review information,
   wherein the prompting the LLM includes providing an instruction that the LLM generates at least one of the questions for the user to provide the additional review information for the portion of the product information.

5. The method of claim 1, wherein the type of the review comprises a combined product review having media content of the product and a usage review of the product, and wherein the questions are separately associated with the media content and the usage review and combined into a questionnaire for the user for the set of the questions.

6. The method of claim 5, wherein the questionnaire comprises subsets of the questions and the requesting the one or more responses comprises:
   querying the user to respond to each of the subsets of the questions, and wherein the method further comprises:
   evaluating the one or more responses to each of the subsets of the questions separately,
   wherein the determining whether to generate the review is based on the evaluating.

7. The method of claim 6, further comprising:
   stopping the querying when a threshold certainty of the authenticity has been met or exceeded based on the evaluating.

8. The method of claim 1, further comprising:
   generating the review for the product in response to the authenticity of the review being verified and the additional review information being obtained from the one or more responses; and
   persisting the review to a distributed record on a blockchain associated with at least one of the product or the merchant, wherein the distributed record is made available to at least one of the merchant or other merchants offering the product for sale on a digital sales platform.

9. The method of claim 1, further comprising:
   flagging at least one of the user or the review as an unauthenticated review if the authenticity of the review cannot be verified based on the one or more responses.

10. The method of claim 1, wherein the determining whether to generate the review comprises:
    scoring the one or more responses for the authenticity of the review; and
    verifying the authenticity based on the scoring.

11. A system comprising:
    a non-transitory memory; and
    one or more hardware processors coupled to the non-transitory memory and configured to execute instructions to cause the system to:
    determine, from a review provided by a user for a product, product information of the product and review information of the product;
    prompt a large language model (LLM) to generate a plurality of questions that verify the review through additional review information provided by the user for the product;

create a questionnaire for the user based on the plurality of questions from the LLM, wherein the questionnaire queries the user to provide the additional review information that enables a verification of the review;

query the user based on the questionnaire; and score a response from the user based on whether the additional review information provided with the response indicates that the review is authentic, wherein the scored response enables the verification of the review and a determination of whether to generate the review having the review information and the additional review information.

12. The system of claim 11, wherein determining the review information comprises identifying a type of the review being provided by the user, wherein the type is associated with at least one of an image, a video, or text provided by the user.

13. The system of claim 12, wherein the text is associated with a description of product attributes of the product, and wherein determining the review information comprises processing the text using a natural language processor that identifies the description in the text.

14. The system of claim 11, wherein the instructions are further executable to cause the system to:

determine a description of the product from one or more responses to the query;

determine a relevancy of the review based on the description of the produce; and determine whether the review is authentic based on the scored response and the relevancy.

15. The system of claim 11, wherein the instructions are further executable to cause the system to:

determine that the review is authentic based on the scored response; and create a blockchain record with a blockchain, wherein the blockchain record comprises the review based on the response.

16. The system of claim 15, wherein the instructions are further executable to cause the system to:

provide the review to at least one other user using the blockchain.

17. The system of claim 15, wherein the instructions are further executable to cause the system to:

score the user based on the review, wherein the blockchain record is further created based on a user score for the user from at least scoring the user based on the review.

18. The system of claim 17, wherein the user score indicates a review trustworthiness of reviews by the user and is used to provide one or more incentives to the user.

19. A non-transitory machine-readable medium having stored thereon machine-readable instructions executable to cause a machine to perform operations comprising:

determining product information for a product that a user is reviewing and review information provided by the user when reviewing the product;

generating, using a large language model (LLM), a plurality of questions that verify whether the user has purchased the product or previously used the product, wherein the generating includes prompting the LLM using the product information, the review information, and one or more instructions for generating the plurality of question;

creating a questionnaire for the user based on the plurality of questions from the LLM, wherein responses to the questionnaire enable a determination of whether the user has purchased or previously used the product is made;

progressively prompting the user via one or more batches of one or more requests from the questionnaire until one or more responses to the one or more requests enable a determination whether the user has purchased or previously used the product; and processing the one or more responses, wherein the processing indicates whether the user has purchased or previously used the product.

20. The non-transitory machine-readable medium of claim 19, wherein the processing the one or more responses comprises:

scoring the one or more responses using a natural language processing and AI system; and comparing the scored one or more responses to a threshold score indicate a review authenticity of a review being provided by the user based on the one or more responses.

* * * * *